United States Patent [19]

LoMaglio

[11] 4,330,351
[45] May 18, 1982

[54] METHOD AND APPARATUS FOR MAKING COLLAPSIBLE DISPENSING TUBES

[75] Inventor: Lewis C. LoMaglio, Baton Rouge, La.

[73] Assignee: Ethyl Corporation, Richmond, Va.

[21] Appl. No.: 223,988

[22] Filed: Jan. 12, 1981

Related U.S. Application Data

[63] Continuation-in-part of Ser. No. 34,400, Apr. 30, 1979, abandoned.

[51] Int. Cl.³ .................. B29D 23/10; B32B 1/08; B32B 1/10
[52] U.S. Cl. .................................. 156/203; 53/550; 53/563; 156/218; 156/308.4; 156/466; 428/36
[58] Field of Search ............. 53/545, 550, 551, 563; 156/203, 217, 218, 308.4, 466; 428/36

[56] References Cited

U.S. PATENT DOCUMENTS 3,388,017  6/1968  Grimsley et al. .................. 156/466
3,779,836  12/1973  Henry et al. ...................... 156/466

*Primary Examiner*—Edward C. Kimlin
*Assistant Examiner*—Robert A. Dawson
*Attorney, Agent, or Firm*—Donald L. Johnson; John F. Sieberth

[57] ABSTRACT

A collapsible dispensing tube is manufactured continuously from a flat sheet or web which is formed into a cylinder having an overlapped seam which is fused together by heat. A single pressure pad containing an induction heating element applies pressure at the seam area while the seam area is heated. The pressure pad containing the source of induction heat is removed, the cylinder is advanced incrementally, and the cycle is repeated.

10 Claims, 2 Drawing Figures

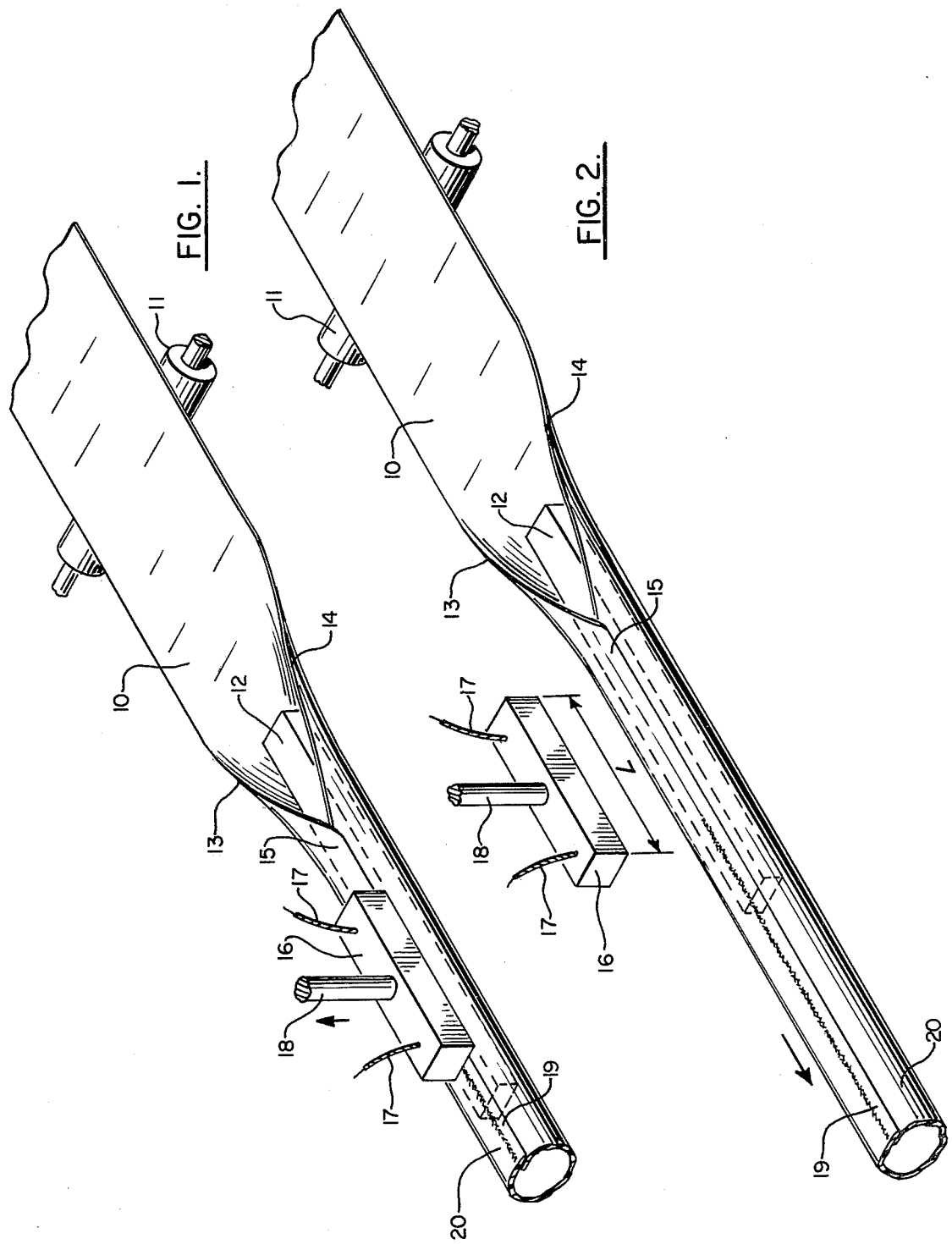

METHOD AND APPARATUS FOR MAKING COLLAPSIBLE DISPENSING TUBES

CROSS REFERENCE TO RELATED APPLICATION

This application is a continuation-in-part of co-pending application Ser. No. 034,400, filed Apr. 30, 1979 and now abandoned.

BACKGROUND OF THE INVENTION

The present invention relates to the manufacture of tubing, and more particularly, to the manufacture of tubing continuously from a sheet or web of heat fusible material, such as plastic, metal foil, or a laminate of plastic and metallic foil. In particular, the invention is directed to forming longitudinally seamed tubing which is cut into body size lengths to use in the manufacturing of collapsible tube containers such as toothpaste tubes.

Plastic tubing for making collapsible container bodies can be manufactured in a number of ways. For example, in U.S. Pat. No. 3,388,017 the collapsible container tubes are made by continuously advancing a web or sheet in the direction of its longitudinal axis, bringing the side edge of the web together to form a cylindrical tube with a seam, gripping the seam and passing the seam through a heating zone to fuse the seam together while maintaining continuous pressure on the seam, and then passing the seam through a cooling zone to solidify the seam. In such a process the tubing is advanced continuously and pressure is applied by an endless sealing band which moves with the advancing tube and applies pressure to the seam of the tube as the tube is being moved beneath heating elements.

One of the most economical ways to make collapsible plastic container bodies is to form the tubing by continuous extrusion, and this is the technique ordinarily practiced where the tube bodies are made entirely of plastic, e.g., polyethylene, polyvinyl chloride, etc. Another technique is to form the tubing from a supply of flat web stock by progressively folding the web around a forming horn or mandrel and seaming its edges together. This latter technique has particular utility and advantages in the making of container bodies of laminated construction comprising one or more plys of a thermoplastic material and one or more layers of a barrier material, such as metallic foil. This enables the use of a wide range of plastic films having special physical and chemical characteristics, and also permits greater versatility in certain of the important secondary operations of collapsible tube body manufacture. For example, preprinting of the flat body stock either on the barrier layer or on one of the plastic films enables greater versatility and selection in decorative art work and ordinarily is faster and therefore more economical than printing on a formed tubular body.

It is important in forming a tubular body that a strong seam is made to prevent the contents of the tube from leaking out through the seam or from the seam rupturing when pressure is applied to the tube. In order to achieve a strong seam it is necessary to apply pressure to the seam when the seam is being bonded by heat.

THE INVENTION

In accordance with the present invention there is provided a method and apparatus for manufacturing a collapsible dispensing tube which is formed continuously from a flat sheet or web which is formed into a cylinder with an overlapped seam which is fused together by heat. A single pressure pad containing an induction heating element applies pressure at the seam area while the seam area is heated to effect fusion of the seam. The pressure pad containing the source of induction heat is removed, the cylinder is advanced incrementally, and the cycle is repeated.

BRIEF DESCRIPTION OF THE DRAWINGS

FIG. 1 is a schematic, perspective, partly cut-away view of the present invention with the heating element contacting the seam of the tube; and, FIG. 2 is a schematic, perspective, partly cut-away view of the apparatus of the present invention with the heating element withdrawn from the tube seam and the tube being advanced.

DESCRIPTION OF THE PREFERRED EMBODIMENTS

Referring now to FIG. 1, there is illustrated a schematic drawing of the preferred or exemplary form of the apparatus for carrying out the invention. A sheet of web 10 of heat fusible material is advanced by any conventional means known in the art over roll 11. The web may be advanced by means shown in U.S. Pat. No. 3,388,017 which is hereby incorporated by reference or by any other appropriate means. For example, as shown in U.S. Pat. No. 3,388,017, a drive belt 10 and pressure roller 21 was used for advancing the web forwardly through the apparatus.

As the web 10 in FIG. 1 advances toward mandrel 12, the edges 13 and 14 are overlapped to achieve an overlapped area 15. The overlapping may be accomplished by any conventional means well known in the art. For example, as illustrated in U.S. Pat. No. 3,388,017, FIGS. 2 and 3, forming unit 17 of U.S. Pat. No. 3,388,017 could be used to overlap the edges of sheet 10.

Mandrel 12 is a solid, rigid piece of stainless steel which is cooled by cold water. Small channels can be formed in the mandrel for coolant flow or other conventional cooling means may be used.

As can be seen in FIG. 1, an induction heating element 16 having power transmission lines 17—17 connected thereto and operated by rod 18 is shown contacting overlap 15 between mandrel 12 and heating element 16 to form finished or fused seam 19. The induction heating element 16 is employed to heat seam 19. Induction heating is well known in the art and need not be explained further herein.

Rod 18 may be connected to any hydraulic or pneumatic piston which may be used to apply pressure to the overlapped area 15 to form seam 19.

At the time heating element 16 is in contact with overlap 15, the web 10 is motionless. As shown in FIG. 2, when heating element 16 is retracted, web 10 is advanced in the direction indicated by the arrow so that a new overlap is advanced beneath heating element 16. The cycle is then repeated by stopping web 10 and pressing heating element 16 against overlap 15 to form seam 19. To achieve a continuous seam 19, the tube 20 is advanced a distance less than the length "L" of element 16. Thus, element 16 strikes a portion of the previously made seam 19 on each cycle after the first seam is made.

Thus, a finished cylinder or tube 20 is continuously formed by the process and apparatus of the invention. Much greater pressure may be applied in the overlap 15 due to the fact the the tube is stopped and heating element 16 contacts the overlap 15 between element 16 and mandrel 12 while the tube is motionless.

Tubes prepared in accordance with the present invention made from laminates of aluminum foil and plastic upon being tested under pressures as high as 60 pounds per square inch were found to rupture in areas other than the overlapped seam 19. Furthermore, in accordance with the present invention, pressures from about 500 pounds per square inch to about 1200 pounds per square inch may be applied to the overlapped area 15 to achieve a strong seam. Preferably, the pressure applied to the overlapped area may vary from about 900 pounds per square inch to about 1100 pounds per square inch.

Web or sheet 10 may be any material having one layer or more which may be heat-fused at the seam. Laminated sheets may contain laminae of metal and thermoplastic.

Having fully described the invention, it is desired that it be limited only within the spirit and scope of the following claims.

I claim:

1. A method for fusing an overlapped area of a tube formed from a heat fusible laminated sheet containing a lamina of metal and a thermoplastic lamina, said method comprising:
   a. advancing said tube over stationary, rigid steel mandrel means;
   b. holding said tube over said mandrel means in a stationary position;
   c. force a single induction heating means against the outside of said overlapped area of the tube to heat the tube and to apply pressure of from about 500 to about 1200 pounds per square inch to said area to fuse said area to form a seam;
   d. removing said single induction heating means from said seam; and,
   e. advancing said tube with said heat fused seam therein a predetermined distance sufficient to allow a portion of said seam to be contacted by said heating means.

2. The method of claim 1 wherein said pressure varies from about 900 pounds per square inch to about 1100 pounds per square inch.

3. The methods of claim 2 wherein said mandrel is a solid piece of stainless steel.

4. The method of claim 3 wherein said mandrel has channels therein for conveying a coolant therethrough.

5. The method of claim 2 wherein said metal is aluminum foil.

6. An apparatus for fusing an overlapped seam area of a tube formed from a heat fusible laminated sheet containing a lamina of metal and a thermoplastic lamina, said apparatus consisting of:
   a. a stationary, substantially solid, rigid mandrel means placed beneath said overlapped area of said tube;
   b. a movable single heating means placed opposite said overlapped area, said heating means being adapted to apply pressure to said overlapped area to form said seam,
   c. means for intermittently advancing said tube over said mandrel a predetermined distance sufficient for a portion of said previously formed seam to be recontacted by said heating means.

7. The apparatus of claim 6 wherein said heating means utilizes induction heating.

8. The apparatus of claim 6 wherein said mandrel is a substantially solid piece of stainless steel.

9. The apparatus of claim 6 wherein said mandrel has channels therein for conveying a coolant therethrough.

10. The apparatus of claim 6 wherein said metal is aluminum foil.

* * * * *